ROBERT SHAW.
Improvement in Hay-Loaders.
No. 125,992. Patented April 23, 1872.
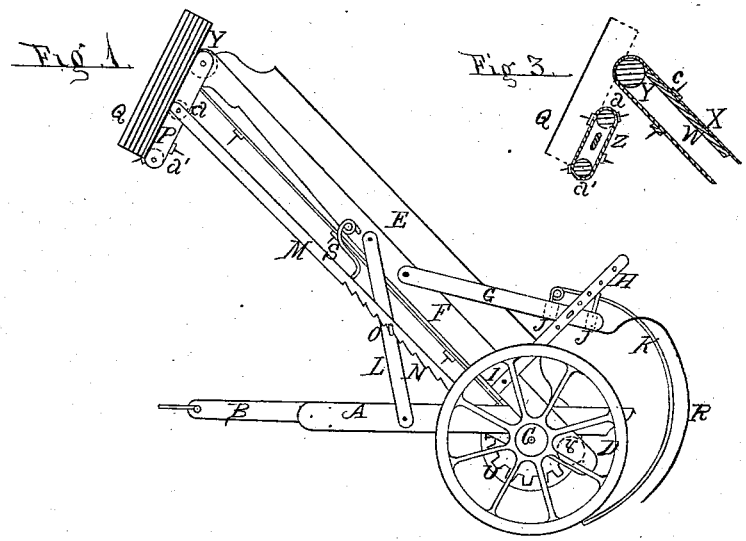
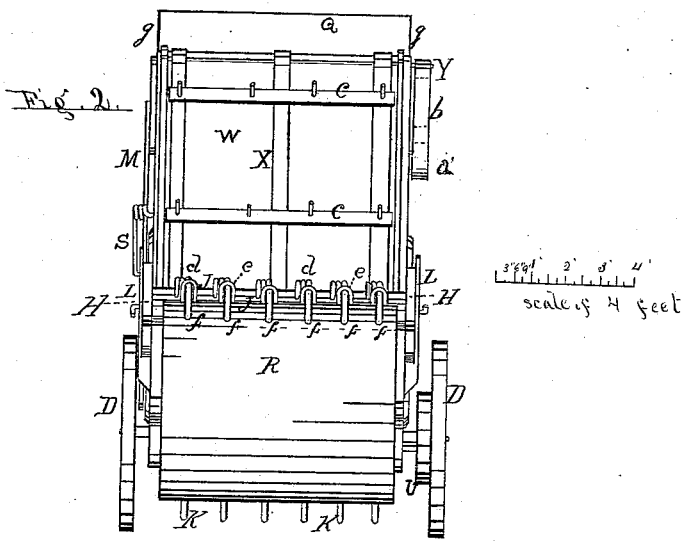
Witnesses
A. Hayward
Sam'l Stuart Jr
Inventor
Robert Shaw
By G. L. Chapin.
Atty 125,992

UNITED STATES PATENT OFFICE.

ROBERT SHAW, OF WARSAW, INDIANA, ASSIGNOR OF ONE-HALF HIS RIGHT TO A. J. MERSHON, OF SAME PLACE.

IMPROVEMENT IN HAY-LOADERS.

Specification forming part of Letters Patent No. 125,992, dated April 23, 1872.

SPECIFICATION.

I, ROBERT SHAW, of Warsaw, in the county of Kosciusko and State of Indiana, have invented an Improved Hay Raker and Loader, of which the following is a specification:

The present invention relates to an improved machine for raking hay, as it is left on a field, and elevating it onto a wagon or other vehicle, as the latter is moved forward; and its nature consists in combining a suitable housing with the rake-teeth, for the purpose of preventing fine hay from falling behind and entangling the rake-teeth and elevator.

In the drawing, Figure 1 represents a longitudinal elevation of my improved hay-raker and loader; Fig. 2, a rear view of Fig. 1; Fig. 3, a section of Fig. 2 on line 2, showing the extension elevator folded down. Fig. 4 shows a section of the extension elevator raised up in line with the main elevator, and in position for hay to pass under the housing.

A F represents the frame of the elevator, and B the tongue or draft-bar, which is to be attached to the rear end of a wagon, so that the machine will move forward with it. At each end of the frame pieces F are pivoted rollers, the ends of which are represented by dotted lines V Y, Fig. 1. These rollers carry the endless belts X and carriers c. The gearing for rotating the lower roller V consists of an internal gear-wheel, U, on one of the traveling-wheels D, which meshes into a pinion attached to one end of said roller. To the frame pieces F F are pivoted arms G G, which support a rake-head, J J. Said arms are adjustable, so that the rake-teeth K may be carried any desired distance above the ground, by means of standards H fastened to the frame pieces F, and provided with a series of holes, in any one of which a pin may be put to hold the rake-head J J up. To the under side of the rake-head is attached a sheet-metal housing, R, or a housing of other suitable material, to prevent fine hay from falling behind the teeth, or from entangling the rake-teeth or elevator. The top part of the housing is provided with such a number of slots as will correspond with the number of rake-teeth which pass through the slots, and the housing is thus brought mainly in rear of the teeth, the slots being long enough to allow the teeth to have sufficient spring movement. An extension elevator, Q, is jointed to the shaft of the upper roller Y of the carrier by means of two end pieces, P, and it is arranged to fold down, as shown at Figs. 1 2 3, when the load on a wagon has commenced, and to rise up, as shown at Fig. 4, when the height of the load requires it. This elevator Q is provided with a housing of sheet metal, or other suitable material, to prevent wind from scattering hay falling on the load. And to accomplish this the hay is carried under the housing, the latter being high enough from the carrier for that purpose. The extension carrier is also provided with a carrier or belt, Z, which runs on rollers pivoted to end pieces P, as shown at $a\ a'$, Figs. 1, 3, and 4. The band for driving the rollers $a\ a'$ is shown at $b$, Fig. 2, one end of which runs over a pulley on the end of roller Y, and the other end over the small roller $a'$, this arrangement being such that the folding of the extension carrier does not effect the tension of the belt $b$. The extension elevator is held in any required position by means of a brace, M, which is pivoted to the end piece P, and is provided with notches N on its lower end which lock onto a pin, O, on standard L, a spring, S, holding the brace fast to the pin. To raise the extension part, as shown at Fig. 4, shove the brace M longitudinally upward, and let it catch a new hold on the pin.

The operation is very simple, requiring only that the rake be made to follow the wagon, and that the several parts be adjusted as described, when, as the rake moves along, hay will be carried onto the wagon.

Claim.

The slotted housing R, attached to the rake-head and arranged mainly in rear of the teeth, in combination with the elevating apron, substantially as described.

ROBERT SHAW.

Attest:
  N. C. BALLOEE,
  D. J. BITNER.